March 20, 1934.　　　G. N. WILLIAMS　　　1,951,891
TWISTING AND LOOPING TOOL FOR WIRE
Filed June 10, 1932
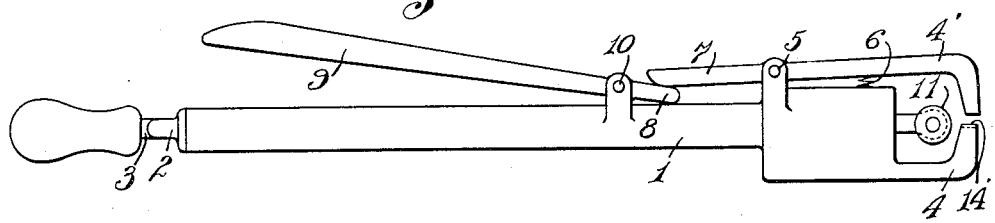
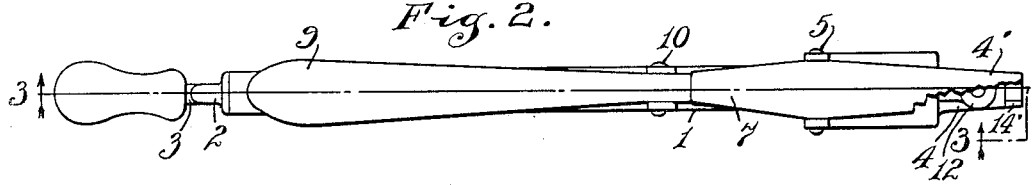
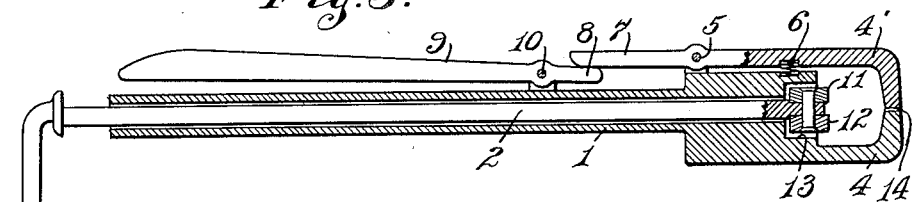
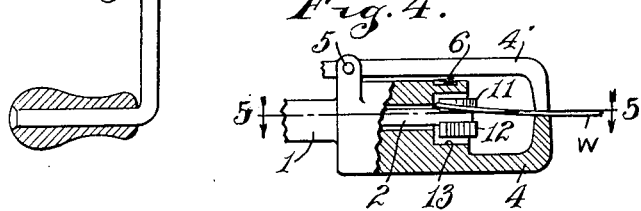
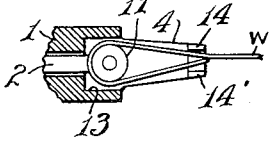
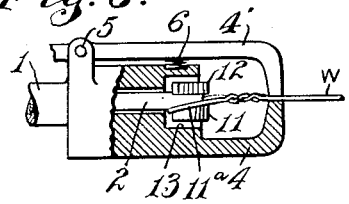
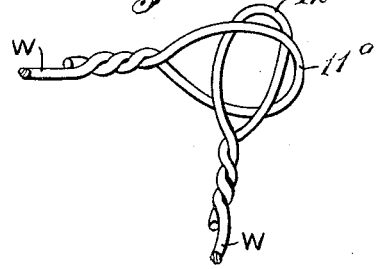
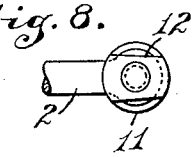
INVENTOR.
George N. Williams.

Patented Mar. 20, 1934

1,951,891

UNITED STATES PATENT OFFICE 1,951,891

TWISTING AND LOOPING TOOL FOR WIRE

George N. Williams, Kokomo, Ind., assignor to Continental Steel Corporation, Kokomo, Ind., a corporation of Indiana Application June 10, 1932, Serial No. 616,505

4 Claims. (Cl. 140—119)

This invention relates to a tool for making twisted loops in wire.

An object of this invention is to form twisted loops in the ends of wire attached to wire-bound boxes.

Another object of the invention is to form twisted loops on opposite ends of individual wires of wire-bound boxes so that one of these loops may be passed through the other loop to form substantial fastening means.

Other objects of the invention will appear as a description of the tool proceeds.

One form of the invention is shown in the accompanying drawing, of which: Figure 1 is a side elevation of my improved tool. Figure 2 is a plan view, with the crank rotated 90° from that shown in Figure 1. Figure 3 is a section taken on the line 3—3 of Figure 2. Figure 4 is a fragmentary view similar to Figure 3, showing the wire inserted. Figure 5 is a view on the line 5—5 of Figure 4. Figure 6 is a fragmentary view similar to Figure 4 after the twisting operation. Figure 7 is a plan view of one of the twister anvils. Figure 8 is a plan view of another form of twister anvil, and Figure 9 is a fragmentary view of the completed loops showing a manner in which one loop passes through the other.

The tool as shown in accompanying drawing consists in a housing 1, having a rotatable shaft 2, slidably mounted in said housing and extending therethrough. Attached to one end of said shaft 2, is the crank 3, for rotating said shaft and moving it longitudinally of said housing 1. Mounted at the other end of shaft 2, and oppositely disposed thereon are anvils 11 and 12. These anvils may be disposed within recess 13 of housing 1, or in an extended position beyond the recess, by a slidable movement of shaft 2.

At the end of the housing 1, farthest removed from crank 3, and forming an integral part thereof, is stationary gripper jaw 4, having wire confining guards 14 and 14'. Oppositely disposed to jaw 4 and rockably mounted on housing 1, at fulcrum 5, is jaw 4', held out of contact with jaw 4 by spring 6. Extension 7 of movable jaw 4' is arranged to overlap extension 8 of lever 9, the latter being secured to housing 1, at fulcrum 10 and rockably mounted thereon.

In practicing the use of this invention the wire W is first bent around anvil 11. Shaft 2, which has been in a forward position as illustrated in Figure 1, is now retracted so that anvil 11 is withdrawn into recess 13, of housing 1, thus preventing the wire W from later slipping off the anvil 11, when shaft 2 is rotated. Lever 9 is now depressed, and being pivotally mounted at fulcrum 10, causes extension 8 to rise. This, in turn, engages extension 7, of movable jaw 4', causing said extension to rise, thus depressing jaw 4' and causing said jaw to engage and securely hold wire W between jaws 4 and 4'. Crank 3 is then turned, causing rotation of shaft 2 and anvil 11, thus twisting the wire W to the form shown in Figure 6.

As the twist is completed shaft 2 is moved forward carrying anvil 11 out of recess 13 to the position shown in Figure 1. Lever 9 is then fully released, allowing spring 6 to disengage jaws 4 and 4' from the twisted and looped wire. The spring action also forces lever 9 into its original position.

The tool is then removed from the wire and the operation repeated on the opposite end of the wire, using anvil 12 instead of anvil 11. Anvil 12 differs from anvil 11 in that its sides are tapered to allow loop 12a of wire W to slip through loop 11a as shown in Figure 9.

What I claim is:

1. A tool for forming a twisted loop in wire, comprising a housing, wire clamping means associated with said housing, a longitudinally movable shaft within said housing, and rotatable therein, a looping anvil on the end of said shaft adapted to be moved into a recess of said housing during the twisting operation, an anvil adapted to have a wire looped thereabout, clamps adapted to firmly hold wire so looped, and means adapted for twisting a wire so looped and clamped.

2. A tool for forming a twisted loop in wire, comprising a housing having wire clamping jaws associated therewith, one of said jaws forming an integral part of said housing, and the other jaw being rockably mounted thereon; a shaft having wire looping means associated therewith, said shaft being rotatably associated with said housing and adapted for longitudinal movement therewith, and adapted to receive a wire having its looped end in association with said looping means, said clamping jaws adapted to hold the free end of a wire, so looped, against the main body of said wire, so that rotation of said shaft is adapted to form said wire into a twisted loop, and means for releasing said twisted loop after forming.

3. A tool for forming a twisted loop in wire, comprising a housing, wire clamping means associated with said housing, a longitudinally movable shaft within said housing, and rotatable therein, unequally sized looping anvils on end of said shaft, adapted to be used alternately, and to be moved into a recess of said housing during the twisting operation, one of said anvils being adapted to have a wire looped thereabout and held firmly in said clamps, and means adapted to twist a wire so looped and clamped.

4. A portable tool for forming a twisted loop in wire, comprising a housing, a twisting shaft rotatable within said housing and slidably mounted therein, wire looping means on said shaft including a looping anvil, said anvil being adapted to have a wire looped thereabout, wire clamping means associated with said housing adapted to firmly hold wire so looped, and means for twisting said looped and clamped wire by rotation of said shaft.

GEORGE N. WILLIAMS.